April 15, 1924.
H. W. BATCHELLER
BICYCLE PEDAL
Filed Sept. 12, 1922
1,490,085
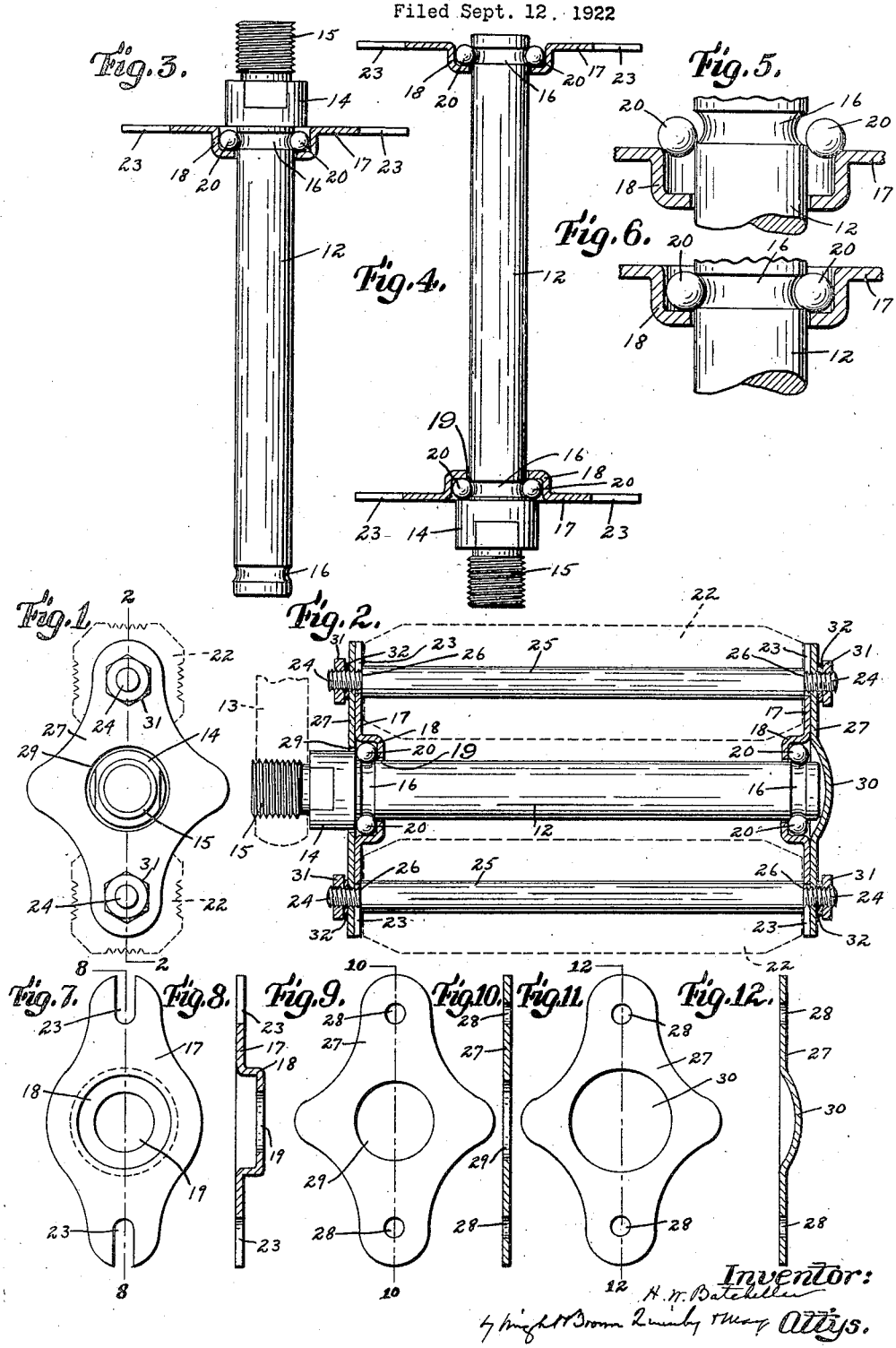
Inventor:
H. W. Batcheller Patented Apr. 15, 1924.

1,490,085

UNITED STATES PATENT OFFICE.

HUGH W. BATCHELLER, OF WORCESTER, MASSACHUSETTS, ASSIGNOR OF ONE-HALF TO H. F. FARRELL, OF WORCESTER, MASSACHUSETTS.

BICYCLE PEDAL.

Application filed September 12, 1922. Serial No. 587,738.

*To all whom it may concern:*

Be it known that I, HUGH W. BATCHELLER, a citizen of the Dominion of Canada, residing at Worcester, in the county of Worcester and State of Massachusetts, have invented new and useful Improvements in Bicycle Pedals, of which the following is a specification.

This invention relates to a bicycle pedal, comprising a crank-pin and a foot-rest frame, adapted to turn thereon by means of anti-friction bearings.

The object of the invention is to provide a pedal of simple, strong and durable construction, and having a relatively small number of parts, which are adapted to be conveniently and economically assembled, so that the pedal may be manufactured at a minimum expense.

The invention is embodied in the improvements hereinafter described and claimed.

Of the accompanying drawings, forming a part of this specification,—

Figure 1 is an end view of a bicycle pedal embodying the invention.

Figure 2 is a section on line 2—2 of Figure 1, the crank-pin and the foot rest supporting rods being shown in side elevation.

Figures 3, 4, 5 and 6 are fragmentary views illustrating the operation of assembling and interengaging the crank-pin, the bearing plates and the rolling members.

Figure 7 is a side view of one of the bearing plates.

Figure 8 is a section on line 8—8 of Figure 7.

Figure 9 is a side view of one of the rod-connecting plates.

Figure 10 is a section on line 10—10 of Figure 7.

Figure 11 is a side view of the other rod-connecting plate.

Figure 12 is a section on line 12—12 of Figure 11.

The same reference characters indicate the same parts in all the figures.

In the drawings, 12 represents a cylindrical arm or pin constituting the wrist-pin of a bicycle crank, and provided at one end with any suitable means for engaging a crank-arm 13. In this instance the inner end of the pin 12 is provided with an enlargement 14, bearing on one side of the crank-arm 13, and with a screw-threaded stud 15, engaging a tapped orifice in the crank-arm. The pin 12 is provided with two spaced apart peripheral grooves 16, constituting circular race elements, one called the inner groove, being located near the enlargement 14, and the other called the outer groove, near the outer end of the pin.

Associated with the pin 12 are two bearing plates 17, forming members of a pedal frame adapted to be set up on the crank pin by the assemblage of its members, as hereinafter described. One of said bearing plates is called the inner, and the other the outer bearing plate. Said plates are provided with annular bosses 18, formed to receive the pin, and forming, with the inner and outer grooves, inner and outer circular races surrounding the crank pin, and containing anti-frictional rolling members such as balls 20. The boss of each bearing plate is provided with a central orifice 19 (Figure 7) formed to receive the pin 12.

The form and arrangement of the grooves 16, the bosses 18, and the rolling members 20, are such that the rolling members are adapted to be interengaged with and confined in the grooves by endwise movements of the pin 12 relative to the bearing plates, so that when the pedal is completed, as shown by Figure 2, the rolling members couple the frame to the pin and prevent endwise movements of the frame on the crank pin.

In assembling said parts the pin 12 is held vertically, with one of its grooves above the mouth of the boss of one of the bearing plates, so that when the rolling members are deposited, as shown by Figure 5, they are supported conjointly by the mouth of the boss and the lower edge of the groove. The pin is then depressed, and the rolling members are thus caused to simultaneously enter the boss and the groove, as shown by Figure 6, an interlocking engagement being thus set up, preventing the parts from again assuming the relative positions shown by Figure 5. The pin and one of the plates are thus connected, as shown by Figure 3. The pin is then inverted, and the other bearing plate is engaged with the other groove by a similar manipulation, so that both plates are connected with the pin, as shown by Figure 4. The assemblage shown by Figure 4, may now be handled as a unit, while the frame is being completed, as hereinafter described.

The pedal includes foot rest-supporting means, connecting the bearing plates 17, and preventing independent rotary movements thereof, said means supporting foot rests 22, of any desired form and material, the material being usually vulcanized rubber.

I prefer to embody said means as next described. The bearing plates 17 are provided at their opposite ends with open slots 23, formed to receive the reduced end portions 24 of rods 25. The rods are movable sidewise into said slots, and are provided with shoulders 26 which bear on the inner sides of the bearing plates 17. 27, 27 represent rod-connecting plates formed to be applied to the pin 12, the rod end portions 24, and the bearing plates 17, after the rods have been inserted in the slots 23. The connecting plates are provided at their end portions with orifices 28, adapted to receive the reduced rod ends 24. One of the connecting plates is provided with a central orifice 29, formed to receive the pin enlargement 14. The inner connecting plate 27 is formed to cooperate with the inner bearing plate 17 and with the rolling members 19 engaged with the inner bearing plate, in preventing endwise movement of the pedal frame in either direction on the crank pin, the inner side of said inner connecting plate 27 at its junction with the orifice 29, being adapted to abut against the rolling members as indicated by Figure 2. The other connecting plate is preferably formed to extend across the outer end of the pin 12, and is provided with a boss 30, which is offset from the outer end of the pin 12, as shown by Figure 2.

The connecting plates 27 bear on the outer sides of the bearing plates 17, and the engagement of their orifices 28 with the ends of the rod 25, prevents said rods from moving sidewise out of the slots 23. The end portions 24 of the rods are adapted to engage clamping means, whereby the connecting plates are confined against the bearing plates, and the bearing plates are confined against the rod shoulders 26, said means being preferably embodied in nuts 31, engaged with the reduced rod ends 24, the latter being screw-threaded.

Spring locking washers 32 are interposed between the nuts 31, and the connecting plates, said washers being compressible by the nuts, and acting to oppose backward rotation of the nuts.

When the pin 12, the bearing plates, and the rolling members have been assembled, as shown by Figure 4, the rods 25, engaged with the foot rests 22, are inserted in the slots 23. The connecting plates 27 are then applied, and finally the clamping nuts 31 are engaged with the rods.

The pedal frame formed by the several plates and the rods is confined by the balls 20, against endwise movement on the pin 12.

It will be seen that I have provided a pedal structure having a small number of parts, and that the parts are adapted to be quickly and conveniently assembled, and are free from liability of accidental separation from each other.

The plates 17 and 27 are of simple form, and adapted to be produced from sheet metal by stamping operations.

The confinement of the pedal frame against endwise movement on the crank pin is caused, in the embodiment of the invention here shown, by the confinement of the two series of rolling members 20 in the two grooves 16, during the operation of setting up the pedal frame on the crank pin. It is obvious, however, that the confinement of one series of rolling members in the corresponding groove is sufficient to confine the pedal frame against endwise movement, and that it is not necessary to rely on the other series of rolling members for this purpose. In view of this fact, certain of the appended claims are drawn without limitation to the confinement of the pedal frame by two sets of rolling members.

It will be seen that the diameter of the bottoms of the grooves 16 is less than that of the crank-pin, and that the diameter of the bosses 18 is greater than that of the wrist-pin. The bosses project from one side of the bearing plates 17, and the open mouth of each boss is adapted to support the rolling members 20 below the corresponding groove as shown by Figure 5, and in such position that when the pin 12 is moved endwise in the bearing plate to the position shown by Figure 6, the rolling members fall into, and are interlocked with the groove 16.

I claim:

1. A bicycle pedal comprising a crank pin having a groove in its inner end portion constituting an element of an inner race; a pedal frame including inner and outer bearing plates having annular bosses formed to receive the pin, and constituting race elements, and connecting means separably connecting said plates and spacing the same apart; rolling members confined in the said groove by the boss of the inner bearing plate, the groove being formed to confine said rolling members against movement in either direction lengthwise of the crank pin, the said connecting means including inner and outer connecting plates, the inner connecting plate being detachably confined by other elements of said means against the inner bearing plate, and provided with a central orifice which receives the crank pin, said inner connecting plate being formed to cooperate with the inner bearing plate and the rolling members in preventing endwise movement of the said frame in either direction on the crank pin; the said pin being provided in its outer portion with a groove constituting an element of an outer race whereof the boss of the outer bearing plate constitutes another element; and rolling members in said outer race, the said bearing plates and connecting means being adapted to be assembled with the rolling members on the crank pin.

2. A bicycle pedal comprising a crank pin having a groove in its inner end portion constituting an element of an inner race; a pedal frame including inner and outer bearing plates having annular bosses formed to receive the pin, and constituting race elements, and connecting means separably connecting said plates and spacing the same apart; rolling members confined in the said groove by the boss of the inner bearing plate, the groove being formed to confine said rolling members against movement in either direction lengthwise of the crank pin, the said bearing plates having open slots in their outer ends, and the said connecting means comprising foot-rest supporting rods laterally movable into said slots and provided with shoulders bearing against the inner sides of the bearing plates and with reduced end portions, rod-connecting plates bearing on the outer sides of the bearing plates and having end apertures receiving said reduced end portions, and clamping means engaged with said end portions, the inner connecting plate being confined by said clamping means against the inner bearing plate and provided with an orifice which receives the crank pin, said inner connecting plate being formed to coöperate with the inner bearing plate and the rolling members in preventing endwise movement of the frame in either direction on the crank pin; the crank pin being provided in its outer portion with a groove constituting an element of an outer race whereof the boss of the outer bearing plate constitutes another element, and rolling members in said outer race, the said bearing plates, connecting plates, rods, and clamping means being adapted to be assembled with the rolling members on the crank pin.

3. A bicycle pedal comprising a crank-pin having an inner peripheral groove in its inner end portion, and an outer peripheral groove in its outer end portion; a pedal frame composed of members adapted to be assembled on the crank-pin, said frame including spaced apart inner and outer bearing plates having annular bosses formed to receive said pin, and means rigidly connecting said bearing plates to prevent independent rotary movements thereof, the boss of the inner bearing plate forming, with said inner groove, an inner circular race; rolling members in said inner race; an outer circular race formed in part by the said outer peripheral groove, and in part by the boss of the said outer bearing plate; and rolling members in said outer race, the arrangement being such that the rolling members are interengaged with and confined in said grooves, to confine the frame against endwise movement in either direction on the crank pin.

In testimony whereof I have affixed my signature.

HUGH W. BATCHELLER.